(12) United States Patent
Imago

(10) Patent No.: US 6,993,525 B1
(45) Date of Patent: Jan. 31, 2006

(54) DOCUMENT-DATABASE ACCESS DEVICE

(75) Inventor: Satosi Imago, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 267 days.

(21) Appl. No.: 09/648,544

(22) Filed: Aug. 28, 2000

(30) Foreign Application Priority Data

Sep. 10, 1999 (JP) .................................. 11-257813

(51) Int. Cl.
*G06F 17/30* (2006.01)
(52) U.S. Cl. ........................................ 707/10; 707/100
(58) Field of Classification Search ............. 707/1–10, 707/513, 103 R, 100
See application file for complete search history.

(56) References Cited

U.S. PATENT DOCUMENTS

| | | | |
|---|---|---|---|
| 5,892,908 A * | 4/1999 | Hughes et al. .............. 709/250 |
| 6,199,081 B1 * | 3/2001 | Meyerzon et al. .......... 707/513 |
| 6,286,006 B1 * | 9/2001 | Bharat et al. ............... 707/100 |
| 6,336,116 B1 * | 1/2002 | Brown et al. ................. 707/10 |
| 6,351,748 B1 * | 2/2002 | Deen et al. ................... 707/10 |
| 6,412,699 B1 * | 7/2002 | Russell et al. ......... 235/472.01 |
| 6,438,592 B1 * | 8/2002 | Killian ....................... 709/224 |

FOREIGN PATENT DOCUMENTS

| | | |
|---|---|---|
| JP | 9-185633 | 7/1997 |
| JP | 2000-172680 | 6/2000 |

* cited by examiner

*Primary Examiner*—Greta Robinson
*Assistant Examiner*—Sathyanarayan Pannala
(74) *Attorney, Agent, or Firm*—Oblon, Spivak, McClelland, Maier & Neustadt, P.C.

(57) ABSTRACT

A document-database access device enables a WWW client to access a URL-linked document correctly and efficiently when accessing a document with a URL link if the document with the URL link and the URL-linked document are uploaded onto a document database, and also enables the WWW client to access each document under a particular folder by supplying different URL formats to the document for specifying an individual document even if documents with a single name exist under the particular folder.

11 Claims, 7 Drawing Sheets

PRIOR ART

PRIOR ART

F I G. 4
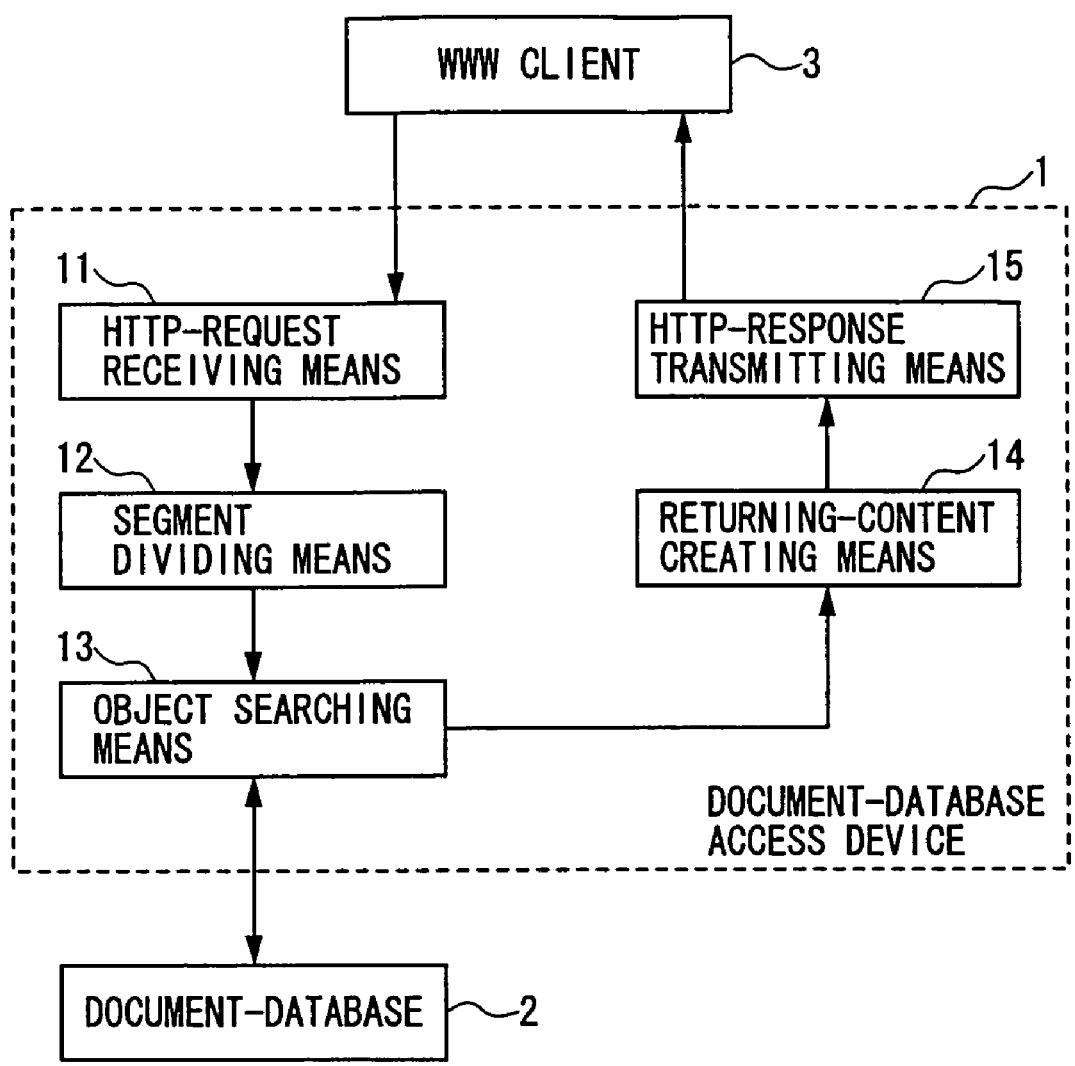

DOCUMENT-DATABASE ACCESS DEVICE

BACKGROUND OF THE INVENTION

1. Field of the Invention

The present invention relates generally to a document-database access device, and more particularly to a method for structuring a URL (Uniform Resource Locators) that is necessary when a WWW (World Wide Web) client accesses a document database, and a document- database access device applying document-database accessing means based on the URL so that the WWW client can follow a hyperlink to retrieve an object document in a case that the document database especially includes a document such as an HTML (Hyper Text Markup Language) document or an XML (Extensible Markup Language) document using a URL as the hyperlink.

2. Description of the Related Art

Japanese Laid-Open Patent Application No. 9-185633 discloses a technology, wherein when a document that includes a hyperlink is uploaded to a WWW server, a group of linked documents are also uploaded to the WWW server. According to the technology, by extracting a URL from the document that is to be uploaded, the document specified by the URL is registered together with the document that includes the URL. The URL can be modified if necessary at the time of an upload process of the documents.

Japanese Laid-Open Patent Application No. 2000-172680 discloses a technology as follows. When a document that includes an URL and a document specified by the URL are uploaded onto a document database, an original URL and a corresponding document identifier in a document database are recorded successively to a correspondence table. In a case that the document is to be taken out from the document database, the document is given to a client after the URL of the document is changed with use of the correspondence table. Though the technology can process any URL, the upload process and a takeout process of the document may take long.

A system using the document database manages contents of the document and bibliography information by relating them with each other, and can retrieve a document under various retrieval conditions. For instance, by setting a document name, an uploading date, a creator name and a word included in the contents of the document as a key, the system using the document database can retrieve the document that fulfills the key conditions.

In the document database, a document may be placed mostly under a folder or a directory. The folders compose a tree structure of the document database, and a necessary document can be retrieved from the document database or can be traced consecutively from the highest-ranked folder to its subfolders. The folders and the documents have names, and when a folder is opened, a list of names of the documents and the subfolders are displayed.

The document database generally includes a server unit and a client unit. The server unit manages document data in the document database. The client unit is operated by a user through a display monitor. A client is a program exclusively used with the document database, and is designed to fit to functions of the document database.

On the other hand, with the propagation of the WWW, it is now necessary to access to the document database not only from the exclusive client but also from a general WWW client, for instance, a WWW browser. In the above-described case, the document database has a function as a WWW server, and a document or a folder in the document database is specified by a URL.

FIG. 1 is a diagram showing one form of a hypertext. The hypertext is logically a single document that is comprised of several linked documents, and is physically divided into several files or nodes. An address of a referred node is specified in order to express a relation from a node to the referred node. For instance in an HTML document, a URL is used for a value of a HREF attribute of an A element or a value of a SRC attribute of an IMG element in order to specify the address of the HTML document.

On the other hand, in the document database, a document cannot be specified only by the file name of the document named before the registration of the document, since different documents might originally have the same file name with the document. Regularly, an identifier ID is given to a single document. The documents and the identifiers are managed in the document database so that the single document corresponding to the identifier is specified if the ID of the document is specified.

FIG. 2 is a diagram showing a situation in which the hypertext shown in FIG. 1 is simply uploaded onto the document database. For instance, a file originally named "hub.html" is managed with a document ID named "doc0001" in the document database. However, the file named "doc0001" includes a URL link address for the other file originally named "note.html". For instance, assume that the file "doc0001" can be accessed from a WWW client through the following address.

http://hostname/document/doc0001

Following the above-described URL, the WWW client obtains the contents of the file "doc0001" from the document database and displays the contents on the monitor. Since the file "doc0001" includes a URL link to the file "note.html", the WWW client interprets the link address as a URL:

http://hostname/document/note.html, and attempts to access the URL. However, the WWW client searches the document with the ID "note.html" through the document database so that the WWW client cannot take out the document corresponding to the file "note.html".

To eliminate the disadvantages described above, a document can be specified ID in the document database by using a folder hierarchy and a file name instead of using the document ID. For instance, if the file "doc0001" shown in FIG. 2 can be accessed through a URL:

http://hostname/folder1/folder2/hub.html, the WWW client attempts to access the link through a URL:

http://hostname/folder1/folder2/note.html

The WWW client can access the file "note.html" if the files "hub.html" and "note.html" exist under the same folder.

However, in this document database using URLs, the WWW client must search contents of each folder in order so that a response speed of the document database becomes slow along with a large document-database load. Additionally in a case that documents with a single name exist under a single folder, the WWW client cannot specify the document in the document database using URLs.

SUMMARY OF THE INVENTION

Accordingly, it is a general object of the present invention to provide a document-database access device that enables a WWW client to access a URL-linked document correctly and efficiently when accessing a document with a URL link if the document with the URL link and the URL-linked document are uploaded onto a document database. It is the other general object of the present invention to provide a document-database access device that enables the WWW client to access each document under a particular folder by supplying different URL formats to the document for specifying an individual document even if documents with a single name exist under the particular folder.

The above-described objects of the present invention are achieved by a document-database access device accessing a document database, wherein a document and a folder have names and can be specified by identifiers, and the document can be placed under the folder with hierarchy, the document-database access device including:

HTTP-request receiving means for receiving an HTTP request from a WWW client;
segment dividing means for separating a URL obtained from the HTTP request into segments;
object searching means for searching for an object document in the document database according to the segments of the URL;
returning-content creating means for creating an HTML document that includes bibliographies of the documents and combinations of the document identifier and the document name if the object searching means retrieves several documents corresponding to a single URL; and
HTTP-response transmitting means for transmitting the HTML document created by the returning-content creating means to the WWW client,
wherein the document-database access device lets the WWW client to display the HTML document on a monitor so that a user can select and click an appropriate document on the monitor.

It should be noted that, hereinafter, the document or the folder is generally referred to as objects.

Other objects, features and advantages of the present invention will become more apparent from the following detailed description when read in conjunction with the accompanying drawings.

BRIEF DESCRIPTION OF THE DRAWINGS

FIG. 4 is a block diagram showing the entire structure of the document-database access device 1 according to the embodiment of the present invention;

DESCRIPTION OF THE PREFERRED EMBODIMENTS

A description will now be given of preferred embodiments of the present invention, with reference to the accompanying drawings.

Figure 1:
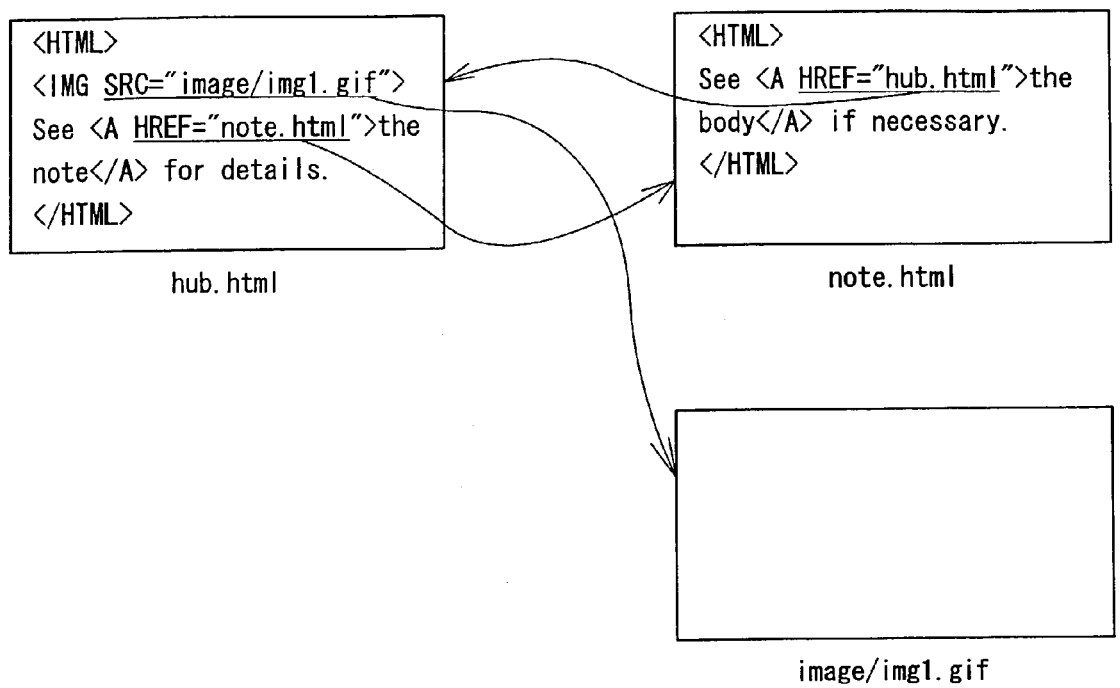
FIG. 1 is a diagram showing one form of a hypertext.
Figure 2:
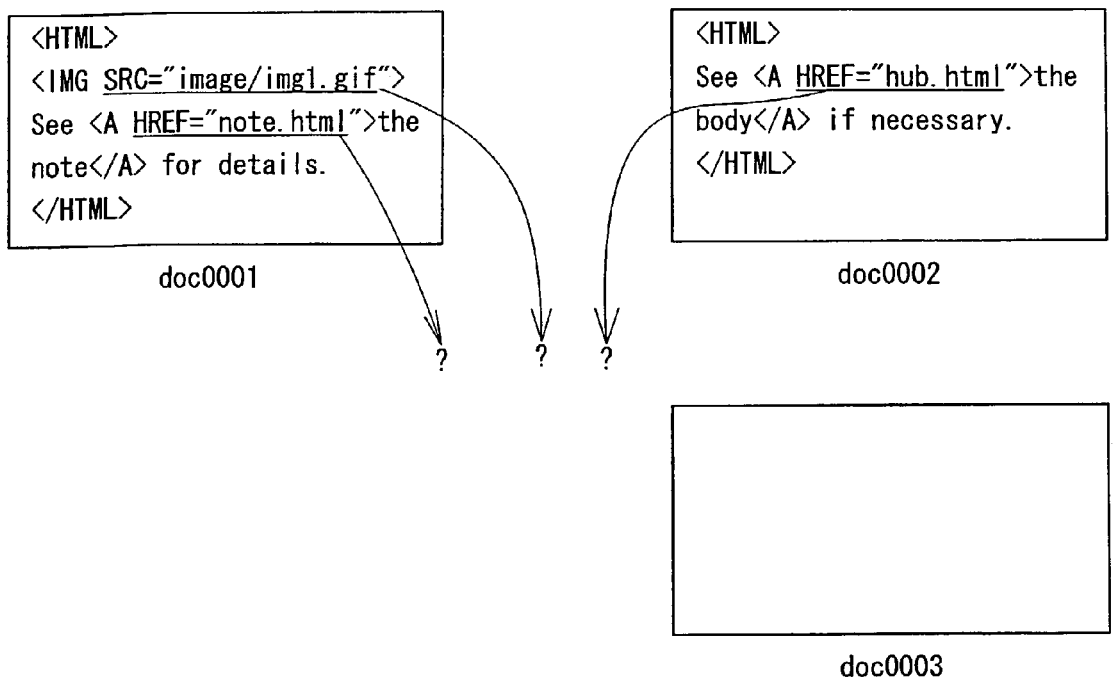
FIG. 2 is a diagram showing a situation in which the hypertext shown in FIG. 1 is simply uploaded onto a document database.
Figure 3:
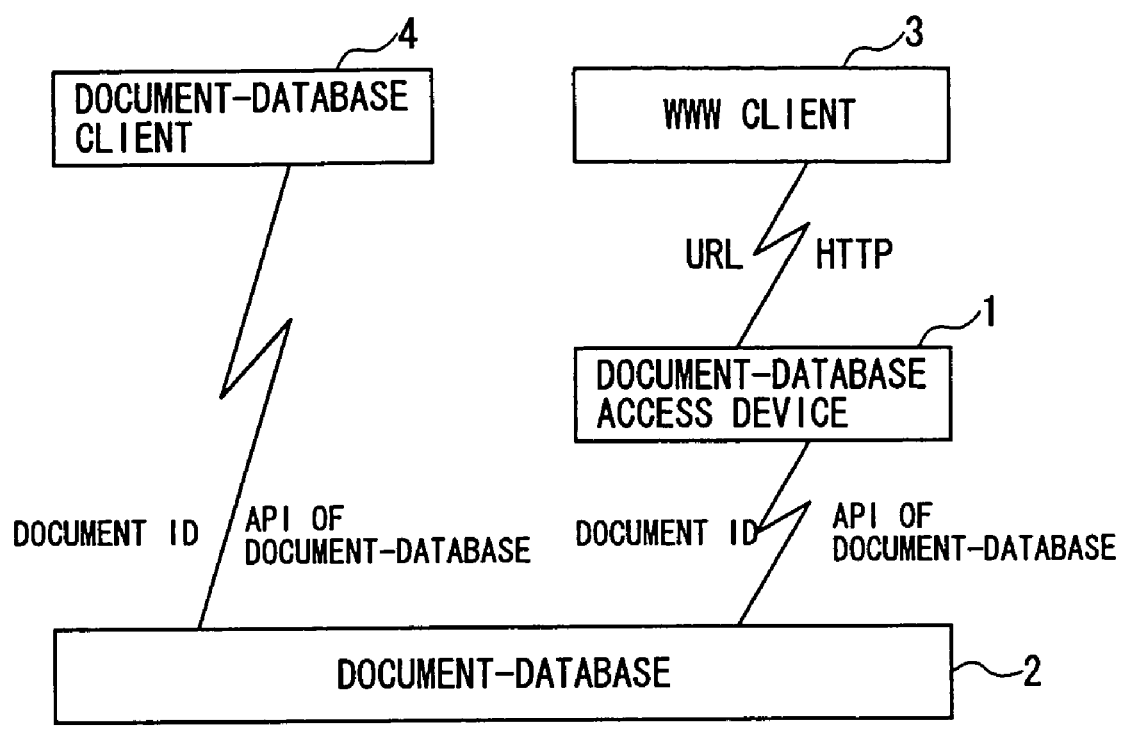
FIG. 3 is a block diagram showing a connection of a document-database access device 1 to other devices according to an embodiment of the present invention.

FIG. 3 is a block diagram showing a connection of a document-database access device 1 to other devices according to an embodiment of the present invention. A document database 2 stores documents and bibliography information. A client accesses a document in the document database 2 through an API (Application Programming Interface) of the document database 2. A document-database client 4 is a program exclusively used with the document database 2, and is designed to fit to function of the document database 2.

The document-database access device 1 is provided so that a general WWW client 3 such as a WWW browser can access the document database 2. The document-database access device 1 works as a client to the document database 2, and as a server when the WWW client 3 accesses it.

A document or a folder stored in the document database 2 is specified on a HTTP (Hyper Text Transfer Protocol) by a URL when the WWW client 3 accesses the object through the document-database access device 1. Subsequently, the document-database access device 1 interprets the URL of the object, and accesses the document database 2 by using the API of the document database 2 and the ID of the object.

FIG. 4 is a block diagram showing the entire structure of the document-database access device 1 according to the embodiment of the present invention. It should be noted that the document-database access device 1 shown in FIG. 4 is identical to the document-database access device 1 shown in FIG. 3. A HTTP-request receiving means 11 receives a HTTP request from the WWW client 3. The HTTP request includes commands such as GET, PUT or the like. A GET request will be described in this embodiment of the present invention. It should be noted that the same process as the GET request is applied to the other requests.

The GET request will now be described. A type of the HTTP request (GET), URL and a HTTP version are recorded on a first line, and a server name or a host name for the document-database access device 1 is recorded on a second line as follows.

GET /_folder0123/image/foo.gif HTTP/1.1
Host:hostname

If the host name is the name of the document-database access device 1, the URL "/_folder0123/image/foo.gif" is taken out and is passed to a segment dividing means 12.

A URL obtained from the first HTTP request line always starts from "/", and the URL "/_folder0123/image/foo.gif" separates each segment with "/". The segment dividing means 12 removes "/" that is placed between each segment, and creates a URL segment table as shown in a TABLE. 1. If the last character of the URL is "/", the segment dividing means 12 sets the content of the last segment empty and stores the empty content to the section with the last segment number.

TABLE 1

| Segment Number | Content of Segment |
| --- | --- |
| 1 | _folder0123 |
| 2 | image |
| 3 | foo.gif |

Figure 5:
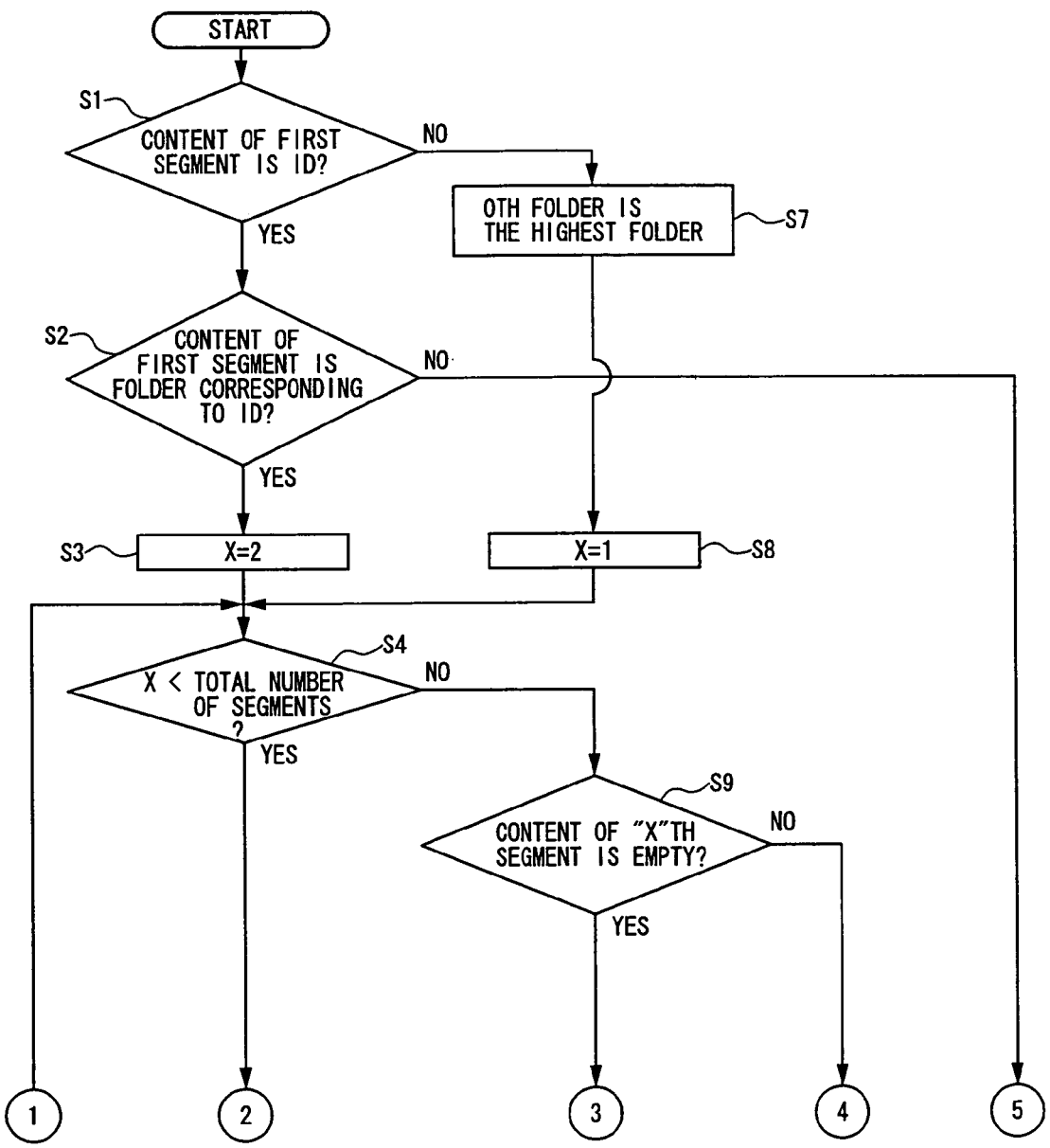
FIG. 5 is a flowchart showing steps for processing an object searching means 13.
Figure 6:
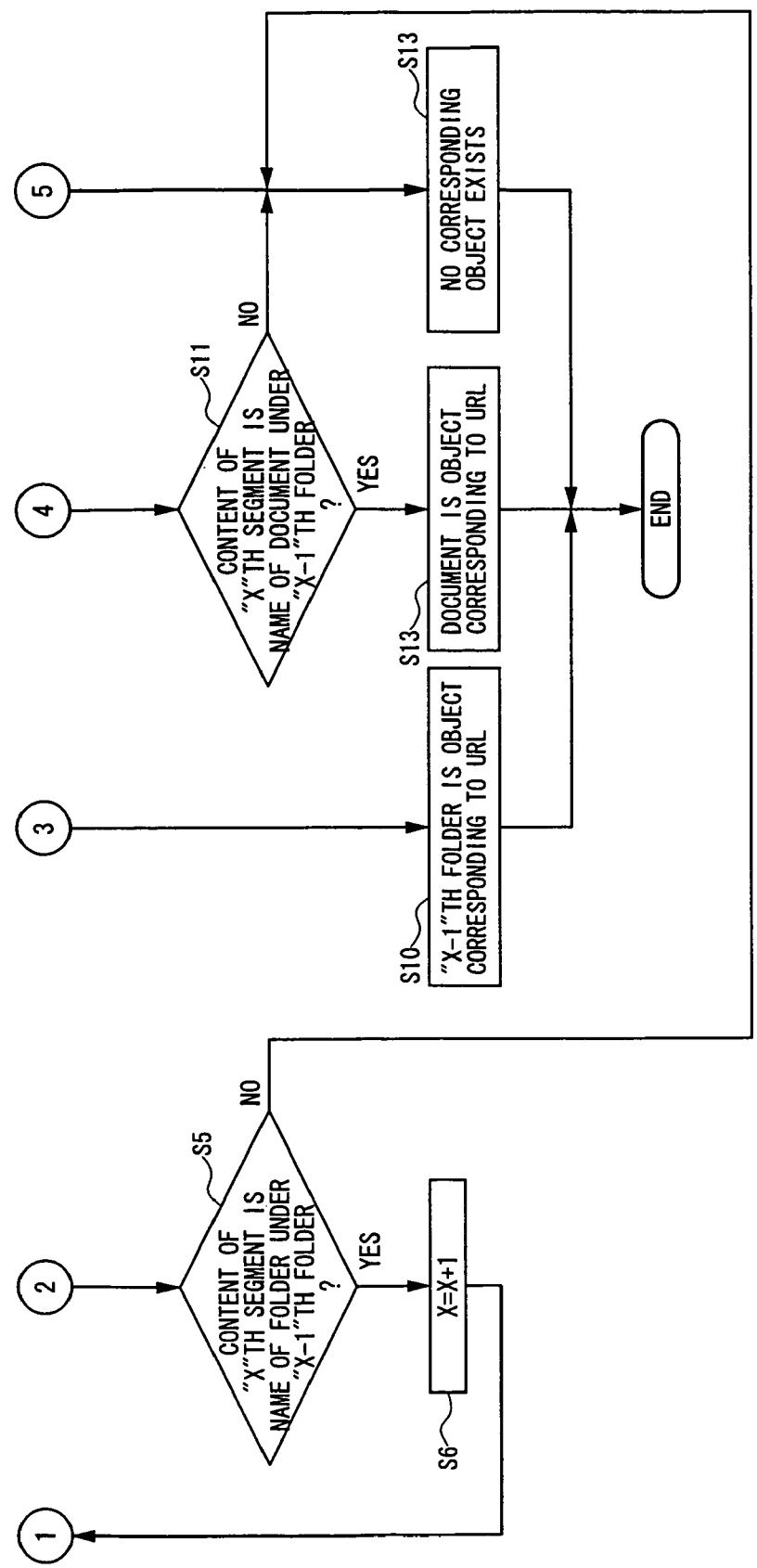
FIG. 6 is a flowchart showing steps for processing the object searching means 13.

FIGS. 5 and 6 are flowcharts showing steps for processing an object searching means 13 shown in FIG. 4. The object searching means 13 searches an object corresponding to "Content of Segment" in the URL segment table (TABLE. 1) from the document database 2. By using a character that does not appear as a first character of a folder name or a document name for a first character of an ID, the object searching means 13 can distinguish between the ID and a name of the folder or the document. In this embodiment of the present invention, "_" is used as the first character of the ID, and "_" does not appear as the first character of the name of the folder or the document. Additionally, a character used as the first character of the ID may be changed on different document databases, and the first several characters, for example, "$$$" may also be used for distinguishing between the ID and the name of the object. At a step S1 of FIG. 5, the object searching means 13 determines whether the content of a first segment is the ID.

"X" shown in FIGS. 3 and 4 indicates a subfolder number of a current folder. For instance, "X−1" indicates a current folder number. If it is ascertained at the step S1 that the content of the first segment is not an ID, the object searching means 13 sets the highest-ranked folder in the document database 2 as a current folder at a step S7, subsequently sets X=1 at a step S8, and proceeds to a step S4. If it is ascertained at the step S1 that the content of the first segment is an ID, the object searching means 13 searches the folder corresponding to the ID in the document database 2 at a step S2. If the folder corresponding to the ID is found at the step S2, the object searching means 13 sets the folder as the current folder and X=2 at a step S3, and proceeds to the step S4. If no folder corresponding to the ID is found at the step S2, the object searching means 13 ascertains that there is no object corresponding to the URL in the document database 2 at a step S13.

At a step S4, the object searching means 13 determines whether X is smaller than a total number of the segments in the URL. If it is ascertained at the step S4 that X is smaller than the total number of the segments, the object searching means 13 proceeds to a step S5, and determines whether the content of the "X"th segment is a folder name under the "X−1"th folder. If the content of the "X"th segment is found to be the folder name at the step S5, the object searching means 13 sets the folder as the current folder and sets X=X+1 at a step S6, and shifts back to the step S4. If the content of the "X"th segment is not found to be the folder name at the step S5, the object searching means 13 ascertains that there is no object corresponding to the URL in the document database 2 at the step S13. The object searching means 13 repeats a step S4, a step S5 and a step S6 until when X is equal to the total number of the segments at the step S4. When X is equal to the total number of the segments at the step S4, the object searching means 13 proceeds to a step S9, and determines whether the content of the last segment of the URL is empty. If the content of the last segment is found to be empty, the object searching means 13 verifies that the object corresponding to the URL is the current folder at a step S10. If the content of the last segment is found to be not empty, at a step S11, the object searching means 13 retrieves the document which name corresponds to the content of the segment under the current folder. At a step S12, the object searching means 13 determines that the document retrieved is the object corresponding to the URL. If the document is not found, the object searching means 13 determines that there is no object corresponding to the URL at the step S13.

A description will now be given of another embodiment of processing steps of the object searching means 13. In this embodiment, the object searching means 13 searches a document when accessing the document using the URL shown below.

/_folder0123/image/_doc0003_foo.gif

The above URL includes segments that are the ID of a parent folder, subfolders and a name successively. The name is a combination of a document ID and the following document name.

If the content of a last segment is found to be not empty at the step S9 shown in FIG. 5, the object searching means 13 checks if the content of the last segment starts with the document ID. If the content of the last segment does not start with the document ID, the object searching means 13 proceeds to the step S11 and executes the above-described steps. If the content of the last segment starts with the document ID, the object searching means 13 divides the name that includes the document ID and the following document name into the document ID and the following document name. Even though "_" is used for separating the document ID and the document name in the embodiment of the present invention, a character or a word that appears in neither the document ID nor the document name can be used for separating the document ID and the document name.

The object searching means 13 searches the document by using the document ID. If the document is found under the current folder and has the same document name as the document name following the document ID of the URL, the object searching means 13 determines the document under the current folder as the object corresponding to the URL. If no document is found or the document found under the current folder has a different name from the document name following the document ID of the URL, the object searching means 13 determines that there is no object corresponding to the URL.

Figure 7:
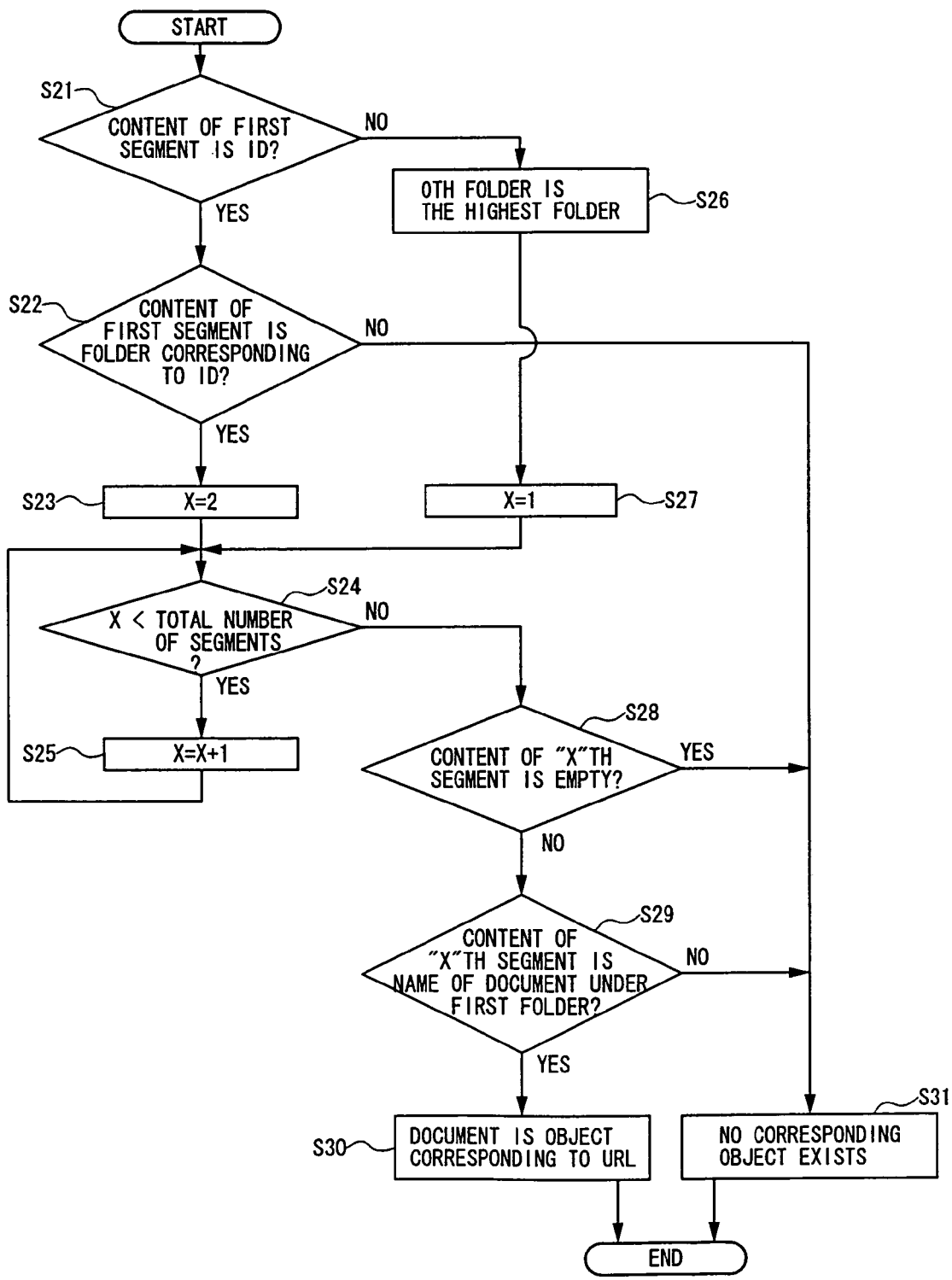
FIG. 7 is a flowchart showing another embodiment of the steps for processing the object searching means 13.

FIG. 7 is a flowchart showing another embodiment of the steps for processing the object searching means 13. In this embodiment, the content of the second segment through the content of the segment that is one before the last segment are ignored. In other words, steps S23, 24 and 25 does not relate to the searching of the object corresponding to the URL. The object searching means 13 searches the document corresponding to the content of the last segment of the URL under the folder that corresponds to the content of the first segment at a step S29. For instance, in the URL segment table as shown in TABLE. 1, the object searching means 13 searches the document with the name "image/foo.gif" under the folder with the ID "_folder 0123".

Accordingly, the document-database access device 1 can return the content of a first document to the WWW client 3 in a short amount of time in a case that the WWW client 3 accesses the first document by following the link in a second document while displaying the second document. When a group of HTML documents created on a local machine are uploaded to the document database 2, the WWW client can follow the hyperlink if a relative link is used for the HTML documents. It is possible for the WWW client to follow the hyperlink since the URL that points a document is comprised of a combination of a folder name and a document name.

A returning-content creating means 14 shown in FIG. 4 creates a returning content and decides a return code for the HTTP and a necessary header for the object. If the object corresponding to the URL is not found by the object searching means 13, the returning-content creating means 14 creates an HTML document for notifying absence of the object. If the object corresponding to the URL exists, the returning-content creating means 14 sets the content of the object as the returning content.

Subsequently, a HTTP-response transmitting means 15 returns the HTML document created by the returning-content creating means 14 with the header to the WWW client 3 that has sent the HTTP request, in the return code decided by the returning-content creating means 14.

A description will now be given of a solution to a case that objects with a single name exist under a single folder. In a general file system, several files with a single name cannot be created under a single folder or a single directory. However, documents with a single name can be created under a single folder on some document database. If the single name of the documents is used in the URL, the object searching means 13 cannot specify which document the URL points to. For instance, if there exist several documents with a name "hub.html" under a single folder with a folder ID "_folder0123" as shown below, the object searching means 13 cannot decide which "hub.html" the WWW client 3 is seeking for.

http://hostname/_folder0123/hub.html

The returning-content creating means 14 sets the HTML document that asks the WWW client 3 which "hub.html" the WWW client 3 needs, as a response content. The returning-content creating means 14 uses the bibliography of "hub.html" and the URL that includes a combination of the document ID and the document name as shown in TABLE. 2 below.

TABLE 2

```
<BODY>
    <P>"http://hostname/_folder0123/hub.html" has the following candidates. </P>
    <UL>
        <LI><A HREF="http://hostname/_folder0123/_doc0003_hub.html">
            Date: 98/4/3, Name: Yamada, Size: 50KB</A></LI>
        <LI><A HREF="http://hostname/_folder0123/_doc4321_hub.html">
            Date: 98/12/23, Name: Kawata, Size: 3KB</A></LI>
    </UL>
</BODY>
```

The WWW client 3 displays the response content as shown in TABLE. 2 on a monitor after receiving it from the returning-content creating means 14. A user can just select and click an appropriate content on the monitor to receive the "hub.html" document. Even if the "hub.html" document includes a hyperlink using a URL, the WWW client follows the link, and can retrieve a document linked to the "hub.html" document if the document linked to the "hub.html" is uploaded under the same folder with the "hub.html" document in the document database 2.

The above description is provided in order to enable any person skilled in the art to make and use the invention and sets forth the best mode contemplated by the inventors of carrying out the invention.

The present invention is not limited to the specifically disclosed embodiments and variations, and modifications may be made without departing from the scope and spirit of the invention.

The present application is based on Japanese Priority Application No. 11-257813, filed on Sep. 10, 1999 with the Japanese Patent Office, the entire contents of which are hereby incorporated by reference.

What is claimed is:

1. A document database access device for accessing a document database to obtain an object document stored in the document database and requested from a WWW client, said document database in which a folder and the object document are identified by an identifier, while a name of the object document can be duplicated and the object document is managed by a folder hierarchy, said document database access device comprising:

HTTP-request receiving means for receiving an HTTP request from the WWW client, said HTTP request including a URL corresponding to said object document;

segment dividing means for separating the URL obtained from the HTTP request into segments and creating a URL segment table that associates a sequential segment number with a content of each segment; and object searching means for determining whether the segment shows the identifier, a name of the folder or the name of the object document, and for searching the object according to the URL segment table based on a determination result;

wherein a last segment shows the name of the object document in the URL segment table.

2. The document database access device as claimed in claim 1, wherein said object searching means searches said document database with use of the URL that includes the identifier of a parent folder as a first segment of the URL, several segments that are subfolders following the first segment of the URL, and a document name as a last segment of the URL following the subfolders.

3. The document database access device as claimed in claim 1, wherein said object searching means searches said document database with use of the URL that includes a document identifier as the last segment of the URL, in addition to the document name.

4. The document database access device as claimed in claim 1, comprising:

returning-content creating means for creating an HTML document that includes bibliographies of the documents and combinations of the document identifier and the document name if said object searching means retrieves several documents corresponding to a single URL; and HTTP-response transmitting means for transmitting the HTML document created by said returning-content creating means to said WWW client;

wherein said document database access device lets said WWW client to display the HTML document on a monitor so that a user can select and click an appropriate document on the monitor.

5. A method for using a document database access device to obtain an object document stored in a document database and requested by a WWW client, said document database in which a folder and the object document are identified by an identifier, while a name of the object document can be duplicated and the object document is managed by a folder hierarchy, said method comprising the steps of:

receiving a HTTP request from said WWW client, said HTTP request including a URL corresponding to said object document;

separating the URL obtained from the HTTP request into segments and creating a URL segment table that associates a sequential segment number with a content of each segment;

determining whether the segment shows the identifier, a name of the folder or the name of the object document; and searching the object according to the URL segment table based on a determination result;

wherein a last segment shows the name of the object document in the URL segment table.

6. The method for accessing the document on said document database as claimed in claim 5, wherein said step of searching for an object document comprises a step of accessing said document database with use of the URL that includes an identifier of a parent folder as a first segment of the URL, several segments that are subfolders following the first segment of the URL, and the document name as a last segment of the URL following the subfolders.

7. The method for accessing the document on said document database as claimed in claim 5, wherein said step of searching for an object document comprises a step of accessing said document database with use of the URL that includes a combination of a document identifier and the document name instead of the document name as the last segment of the URL.

8. The method for accessing the document on said document database as claimed in claim 5, further comprising the steps of:

creating an HTML document that includes bibliographies of the documents and combinations of a document identifier and a document name if several documents corresponding to a single URL are accessed under a particular folder;

returning the HTML document to said WWW client; and displaying the HTML document received by said WWW client on a monitor so that a user can select and click an appropriate document on the monitor.

9. A method for structuring a URL used in a document database in which a folder and the object document are identified by an identifier, while a name of the object document can be duplicated and the object document is managed by a folder hierarchy, the method comprising the steps of:

designating a unique character or group of characters that cannot appear as a first character or a group of characters in a folder name or a document name of the URL;

providing a first segment of the URL with an identifier of a parent folder, which is expressed as said unique character or group of characters;

providing several segments that are subfolders following the first segment of said URL; and providing the document name as a last segment of said URL following the subfolders.

10. The method for structuring said URL as claimed in claim 9, further comprising the step of providing a document identifier as the last segment of said URL, in addition to the document name.

11. A document database access device for accessing a document database to obtain an object document stored in the document database and requested from a WWW client, said document database in which a folder and the object document are identified by an identifier, while a name of the object document can be duplicated and the object document is managed by a folder hierarchy, said document database access device comprising:

HTTP-request receiving means for receiving an HTTP request from the WWW client, said HTTP request including a URL including a representative information representing a stored place of said object document in accordance with a format of storing the documents to the document database;

segment dividing means for separating the URL obtained from the HTTP request into segments and creating a URL segment table that associates a sequential segment number with a content of each segment; and object searching means for determining whether the segment shows the identifier, a name of the folder or the name of the object document, and for searching the object according to the URL segment table based on a determination result;

wherein a last segment shows the name of the object document in the URL segment table.

* * * * *